(12) United States Patent
Tani et al.

(10) Patent No.: US 9,508,029 B2
(45) Date of Patent: Nov. 29, 2016

(54) OPERATION CONSOLE, ELECTRONIC DEVICE AND IMAGE PROCESSING APPARATUS PROVIDED WITH THE OPERATION CONSOLE, AND METHOD OF DISPLAYING INFORMATION ON THE OPERATION CONSOLE

(75) Inventors: Takeshi Tani, Osaka (JP); Minami Sensu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 89 days.

(21) Appl. No.: 13/045,875

(22) Filed: Mar. 11, 2011

(65) Prior Publication Data
US 2011/0235110 A1 Sep. 29, 2011

(30) Foreign Application Priority Data
Mar. 23, 2010 (JP) .................................. 2010-065398

(51) Int. Cl.
*G06K 15/00* (2006.01)
*G03G 15/00* (2006.01)

(52) U.S. Cl.
CPC .............. *G06K 15/005* (2013.01); *G03G 15/00* (2013.01); *G03G 15/502* (2013.01)

(58) Field of Classification Search
CPC .............................. G03G 15/00; G03G 15/502
USPC ......... 358/115, 1.13, 448, 1.18, 1.15; 399/81
See application file for complete search history.

(56) References Cited

U.S. PATENT DOCUMENTS

| 5,950,045 | A | * | 9/1999 | Nomura et al. ................. 399/81 |
| 5,956,025 | A | | 9/1999 | Goulden et al. |
| 2007/0028182 | A1 | * | 2/2007 | Kong .................... G06F 3/0481 715/764 |
| 2007/0291286 | A1 | * | 12/2007 | Utsunomiya et al. ......... 358/1.8 |
| 2008/0225346 | A1 | * | 9/2008 | Mano et al. .................. 358/448 |
| 2009/0116051 | A1 | * | 5/2009 | Kasai ................... G03G 15/553 358/1.13 |
| 2009/0190169 | A1 | * | 7/2009 | Toyamasaki ......... H04N 1/0035 358/1.15 |
| 2009/0316176 | A1 | * | 12/2009 | Fujimori et al. ............. 358/1.13 |
| 2010/0037277 | A1 | * | 2/2010 | Flynn-Ripley et al. ...... 725/110 |
| 2011/0261380 | A1 | * | 10/2011 | Kwon .......................... 358/1.13 |

FOREIGN PATENT DOCUMENTS

| JP | 63-231368 A | 9/1988 |
| JP | 2000-516788 A | 12/2000 |
| JP | 2009-177526 A | 8/2009 |

* cited by examiner

*Primary Examiner* — Tammy Pham
*Assistant Examiner* — Bharatkumar Shah
(74) *Attorney, Agent, or Firm* — Renner, Otto, Boisselle & Sklar, LLP

(57) ABSTRACT

On a touch-panel display of an image forming apparatus, which is divided to five areas, that is, a system area, a function selection area, a preview area, an action panel area and a task trigger area, pieces of information are displayed. Even if an operational mode is switched, the same or similar information is always displayed in the area arranged at the same position. In the task trigger area, software buttons operated by the user for actually operating the image forming apparatus are displayed.

8 Claims, 8 Drawing Sheets

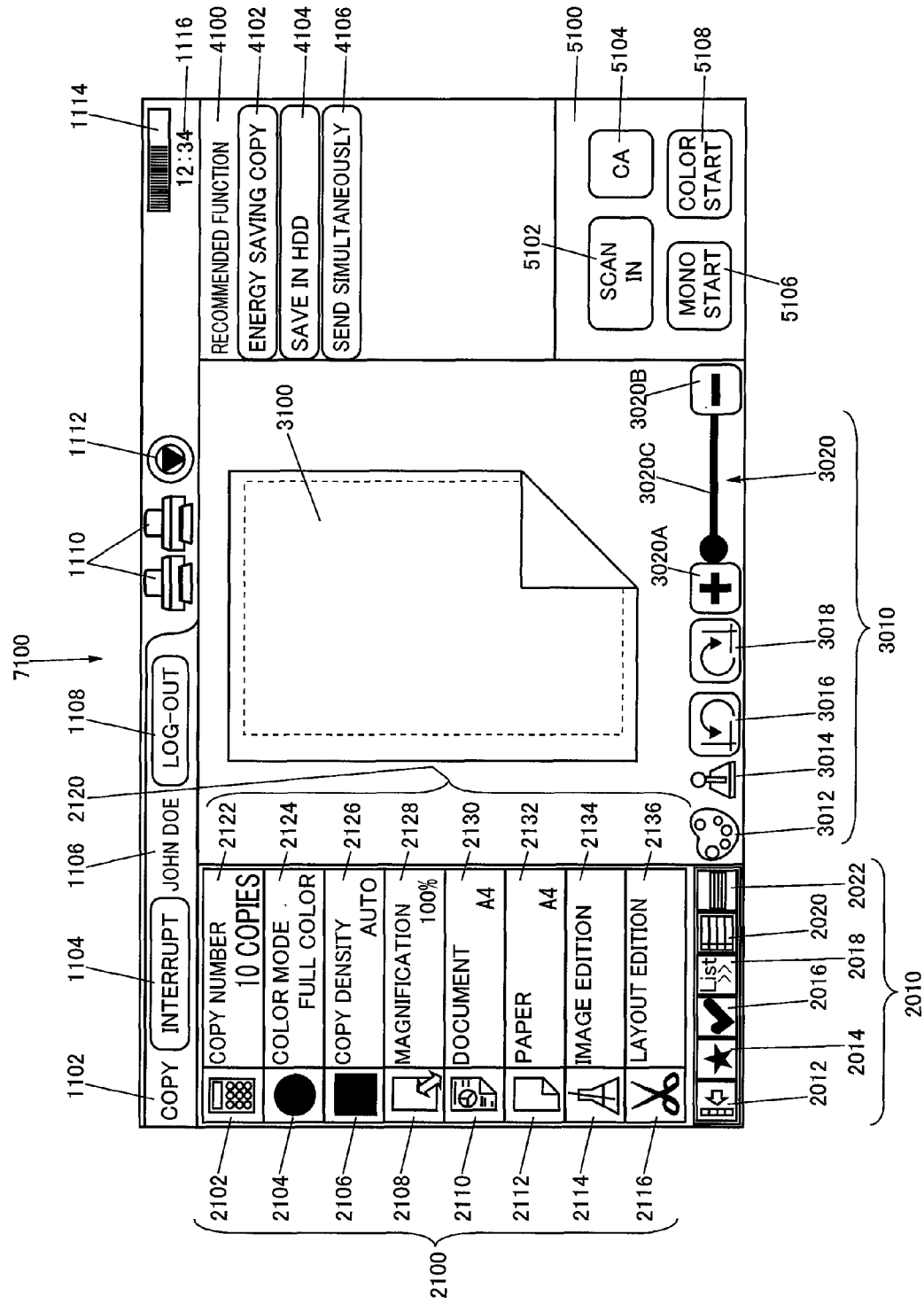

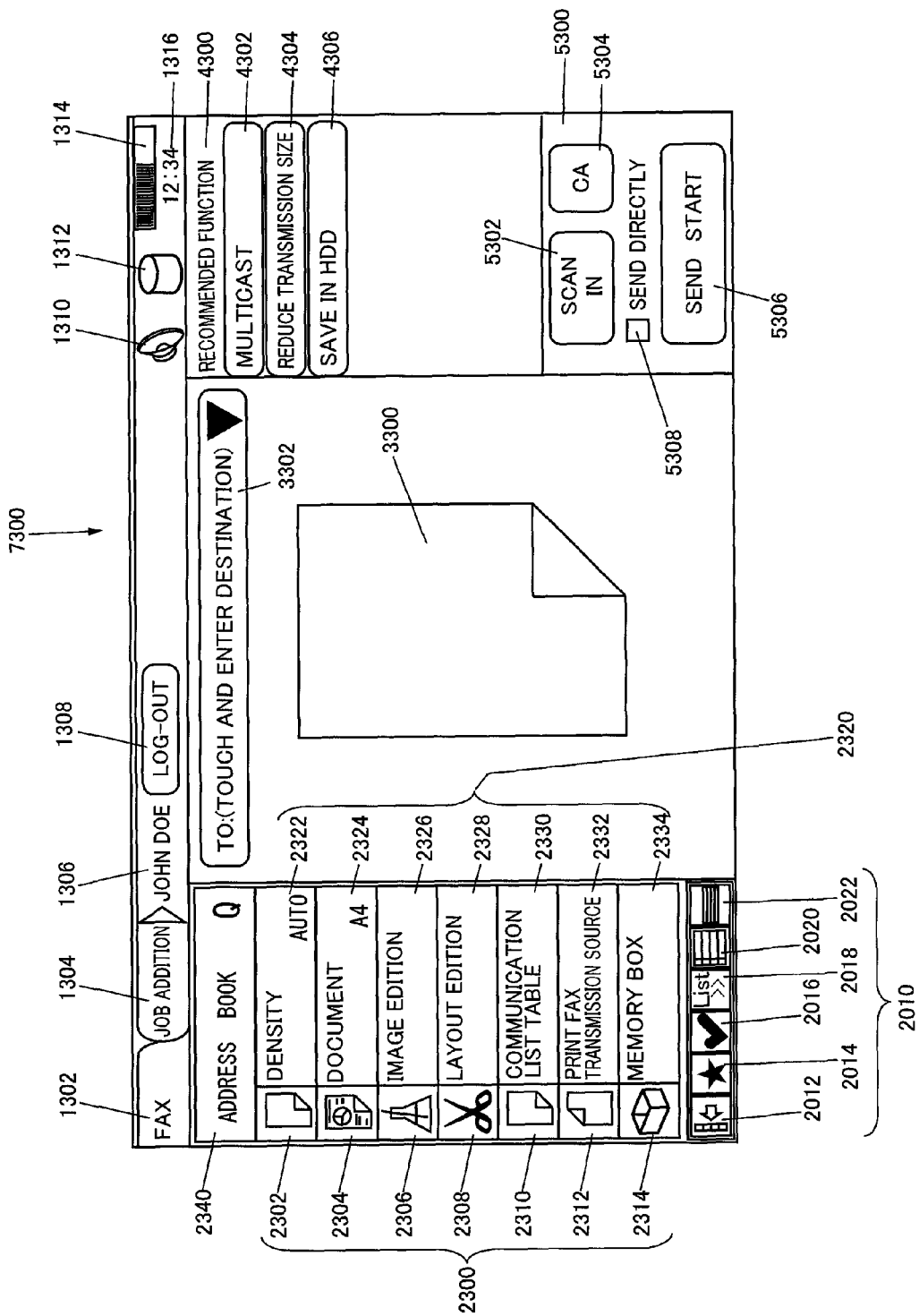

OPERATION CONSOLE, ELECTRONIC DEVICE AND IMAGE PROCESSING APPARATUS PROVIDED WITH THE OPERATION CONSOLE, AND METHOD OF DISPLAYING INFORMATION ON THE OPERATION CONSOLE

CROSS-REFERENCE TO RELATED APPLICATION

This nonprovisional application claims priority under 35 U.S.C. §119(a) on Patent Application No. 2010-065398 filed in Japan on Mar. 23, 2010, the entire contents of which are hereby incorporated by reference.

BACKGROUND OF THE INVENTION

1. Field of the Invention

The present invention relates to an operation console displaying information to a user and allowing the user to operate based on the information. More specifically, the present invention relates to an operation console displaying pieces of information on a plurality of divided areas that allows, even when an operational mode of an electronic device or an image processing apparatus provided with the operation console is changed and screen image thereof is changed accordingly, the user to accurately grasp information related to process requests displayed in each operational mode. The present invention also relates to the electronic device and the image processing apparatus provided with the operation console, as well as to a method of displaying information on the operation console.

2. Description of the Background Art

As one type of image processing apparatuses as electronic equipment, image forming apparatuses forming images on recording paper (typically, copy machines) are introduced to many places of business (companies and offices). In such a place of business, it has become increasingly common to connect an image forming apparatus having a printer function or a copy function to a network, to allow use (sharing) by a plurality of users. A multifunction peripheral (MFP) as one type of such image forming apparatuses has a plurality of basic operational modes such as a copy mode, a facsimile mode (hereinafter "facsimile" may also be denoted as FAX or fax), a network-supported printer mode and a scanner mode. In such an image forming apparatus, each user selects an operational mode and selects and makes settings of a function of duplex (two-sided) printing or collective printing (such as 2-in-1 by which two pages of an original document are printed on one sheet, or 4-in-1 by which four pages of an original document are printed on one sheet), whereby images are formed on sheets of paper in a desired manner. Appropriate combinations of these functions come to be more frequently used.

When a user uses such an image forming apparatus, for example, the user inputs image data in the scanner mode, performs image processing (such as collection) by inputting various instructions through an operation panel, and prints the results on a sheet of recording paper. In such a situation, the operation panel, serving as an operation and display unit, functions as an interface between the image forming apparatus and the user. Generally, on the operation panel, a screen image for setting functions in each operational mode is displayed, so that the user can easily set various functions. Further, while a job is being executed, job progress status may be displayed, to allow the user to easily grasp the progress status of the job. In the printer mode executed upon reception of data from an external device, the job progress status may be displayed in accordance with the data received from the external device as a source.

Recently, a touch-panel display having a touch-panel formed on a liquid crystal panel (display panel) comes to be increasingly used as such an operation panel. By way of example, items (software buttons) allowing selection of a mode of the image forming apparatus are displayed on the touch-panel display, the user viewing the display presses a position of an item displayed on the touch-panel display (presses a software button), and the operational mode is set.

Such a touch-panel display having both the display and operation functions is advantageous in that it eliminates the necessity of providing a display unit and an operation unit separately. Further, it attracts attention recently since a command can be selected advantageously in accordance with the user's sense, when it is adapted such that a command can be selected in accordance with a trajectory of pressing of the touch-panel display by the user's finger. Examples of such command selection using finger trajectory include the following.

When a plurality of pages are displayed on the touch-panel display as print previews, the following operations may be performed. By a user operation of lightly tapping twice (hereinafter also referred to as double-tapping) a position of a certain page displayed as a preview, a command to display the page in an enlarged or reduced size can be selected. By a user operation trajectory of expanding a space between two fingers (hereinafter also referred to as pinch-out or pinch-open), a command to display the page in an enlarged size can be selected, and by a user operation trajectory of reducing a space between the two fingers (hereinafter also referred to as pinch-in or pinch-close), a command to display the page in a reduced size can be selected. In the following, these operations are denoted as gesture operations. The gesture operations are not limited to the above, and may include: tapping, or lightly touching an item displayed on the touch-panel display; dragging, or sliding an item with a finger; flicking, or lightly sweeping an item to scroll; and pinching with two fingers. It is noted that, strictly speaking, the tapping and double-tapping are not determined by the user operation trajectory on the touch-panel display (determined not by the trajectory but by detection of a position). The user's request, however, can also be detected by these operations and, therefore, these are also included in the gesture operations in the present specification.

Further, in the present specification, an operation other than the gesture operations as such will be described as a touch operation. The touch operation means an operation of detecting a user's request based on the position of operation by the user on the touch-panel. A representative example of the touch operation is an operation of the user pressing a position of an item (pressing a software button) displayed on the touch-panel display.

In an MFP provided with a touch-panel display allowing both touch operation and gesture operation, many pieces of information intended for the user are displayed on the touch-panel display. Such an MFP has a plurality of basic operational modes as described above, and the user selects an operational mode of the MFP. After selecting an operational mode, the user inputs various settings for the operational mode, and thereafter, inputs an image formation request. Such selection and input by the user are made by pressing software buttons displayed on the touch-panel display.

By way of example, Japanese Patent Laying-Open No. 2009-177526 (hereinafter referred to as '526 Reference) discloses an image processing apparatus that can improve convenience of operation. The image processing apparatus executes any one of facsimile, copy and scanner jobs. The image processing apparatus is provided with a mode selection key, a touch-panel, a first start key and a second start key. The mode selection key is for selecting an easy-operation mode, allowing execution of a job by an easy operation. When the easy-operation mode is selected by the mode selection key, an operation screen image used for an operation in the easy-operation mode is displayed on the touch-panel. The first start key is a hardware button provided outside of the touch-panel, for instructing execution of a job. The second start key is a software button provided on the operation screen image, for instructing execution of a job in the easy-operation mode.

In the image processing apparatus, separate from the first start key implemented by a hardware button, the second start key is provided as a software button on the operation screen image of the easy-operation mode, serving as a start key in that mode. Thus, convenience of operation in the easy-operation mode can be improved.

As disclosed in '526 Reference above, in various electronic devices including the image processing apparatus, a touch-panel display is provided as an operation console. Various pieces of information are displayed on the touch-panel display. One example of the displayed information is the second start key disclosed in '526 Reference. FIGS. 3 to 6 of '526 Reference show the touch-panel display on which the second start key is displayed.

In these figures, however, the second start key (software button) is displayed at different positions. Therefore, unless the user remembers the position of the start key in each operational mode, it is necessary for the user to find the start key arranged at different positions in different operational modes and to input a process request. This leads to a problem that the user is confused, makes erroneous operation and takes longer time for operation.

SUMMARY OF THE INVENTION

In view of the foregoing, it is desirable to provide, in an electronic device and an image processing apparatus (image forming apparatus) that operate switching among a plurality of operational modes, a technique allowing the user to easily find the process request information required by the user, even when the operational mode is switched and the screen image on the operation console is changed accordingly.

According to an aspect, the present invention provides an operation console provided on an apparatus as an object of control operating in one operational mode selected by a user from a plurality of operational modes. The operation console includes: a display unit displaying information corresponding to the selected operational mode to the user; a detecting unit, arranged on the display unit, for detecting a request of the user based on a position touched by a finger tip of the user; and a display control unit dividing the display unit to a plurality of areas and displaying pieces of information while maintaining arrangement of divided areas even when the selected operational mode is changed. The display control unit displays a plurality of information items allowing the user to input, using the detecting unit, a request related to a process executed by the apparatus as the object of control, at the same position in each operational mode. The plurality of information items include items allowing the user to input at least one of a first request for forming data in a final form, a second request for forming data in an intermediate form and a third request for cancelling setting related to data formation, in the apparatus as the object of control.

According to another aspect, the present invention provides a method of displaying information in an operation console provided on an apparatus as an object of control operating in one operational mode selected by a user from a plurality of operational modes. The method of displaying information includes: the display step of displaying information corresponding to the selected operational mode on a display panel; the detecting step of detecting a user request based on a position touched by a finger tip of the user, on a touch-panel arranged on the display panel; and the display control step of dividing the display panel to a plurality of areas and displaying pieces of information while maintaining arrangement of divided areas even when the selected operational mode is changed. The display control step includes the step of displaying a plurality of information items allowing the user to input, through the touch-panel, a request related to a process executed by the apparatus as the object of control, at the same position in each operational mode. The plurality of information items include items allowing the user to input at least one of a first request for forming data in a final form, a second request for forming data in an intermediate form and a third request for cancelling setting related to data formation, in the apparatus as the object of control.

By the operation console and the method of displaying information on the operation console, no matter whether the apparatus as the object of control operates in the first operational mode or the second operational mode selected by the user, pieces of information are displayed to the user with the arrangement of divided areas kept constant. Further, among the plurality of areas arranged as described above, even in different operational modes, information items allowing the user to input a request related to a process by the apparatus as the object of control are displayed on an area arranged at the same position. By way of example, assume that the apparatus as the object of control is an image forming apparatus. On the display panel, an image scan request, a copy request or a transmission request as the request related the process executed by the apparatus as the object of control is displayed on an area arranged at the same position, both in the copy mode and the facsimile mode. Therefore, even when the operational mode is switched and the display screen image is changed accordingly, the process request information required by the user can easily be found from among the pieces of displayed information. Further, it is possible for the user to easily find the first request (for example, copy request) for forming data in the final form, the second request (for example, scan request) for forming data in an intermediate form, and the third request (for example, request for clearing set parameters) for cancelling setting of data formation, even when the operational mode is switched and the display screen image is changed accordingly.

The display control unit may display the plurality of information items in the same area in each operational mode.

Even in different operational modes, a plurality of information items allowing the user to input a request related to a process executed by the apparatus as the object of control are displayed on areas arranged at the same positions. Assuming that the apparatus as the object of control is an image processing apparatus, a plurality of requests including a request for scanning an image as the object of image processing and a request for processing (editing) the scanned image data are displayed at the same positions. As a result, even when the operational mode is switched and the screen image on the operation console is changed accordingly, it is possible for the user to easily find the plurality of pieces of process request information.

The display control unit may display an item allowing input of the third request close to another item. Further, the display control unit may display an item allowing input of the third request close to all other items.

The item for inputting the third request (request for clearing set parameters) for cancelling setting of data formation is displayed close to (or immediately adjacent and without any space to) an item or items for inputting other requests. Therefore, the user can easily find the clear request.

The display unit and the detecting unit may constitute a touch-panel display.

Since the touch-panel display having a touch-panel as a detecting unit arranged on the display panel as a display unit is used, even when the operational mode is switched and the screen image on the touch-panel display is changed accordingly, it is possible for the user to easily find the process request button implemented by the touch-panel display.

According to another aspect, the present invention provides an electronic device provided with the operation console described above. According to a still further aspect, the present invention provides an image processing apparatus provided with the above-described operation console.

In the electronic device and the image processing apparatus, it is possible for the user to easily find the process request information necessary for the user, since the request related to the process executed by the electronic device or the image processing apparatus is displayed on the area arranged at the same position even in different operational modes of the electronic device or different operational modes of the image processing apparatus (image forming apparatus).

In the image processing apparatus in accordance with the present invention, the item allowing input of the first request is information related to an operation button for inputting an image formation request, or information related to an operation button for inputting an image transmission request; the item allowing input of the second request is information related to an operation button for inputting an image capture request; and the item allowing input of the third request is information related to an operation button for cancelling contents set for image processing.

Assume that the image processing apparatus includes the copy mode, facsimile mode and mail mode (or it may further include other operational mode or modes). Then, a copy start button for inputting an image formation request, a transmission start button for inputting an image transmission request, a scan start button for inputting a request for obtaining an image, a clear button for clearing set parameters and the like are displayed on the same area on the touch-panel display. Therefore, even when the operational mode is switched and the screen image on the touch-panel display is changed accordingly, it is possible for the user to easily find these buttons displayed on the touch-panel display.

According to the present invention, in an electronic device including an image processing apparatus (image forming apparatus) that operates switching among a plurality of operational modes, it is possible to find process request information required by the user even when the operational mode is switched and screen image on the operation console is changed accordingly.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6 to 8 show exemplary screen images displayed on the touch-panel display of the image forming apparatus in accordance with the embodiment of the present invention.

DESCRIPTION OF THE PREFERRED EMBODIMENTS

Figure 1:
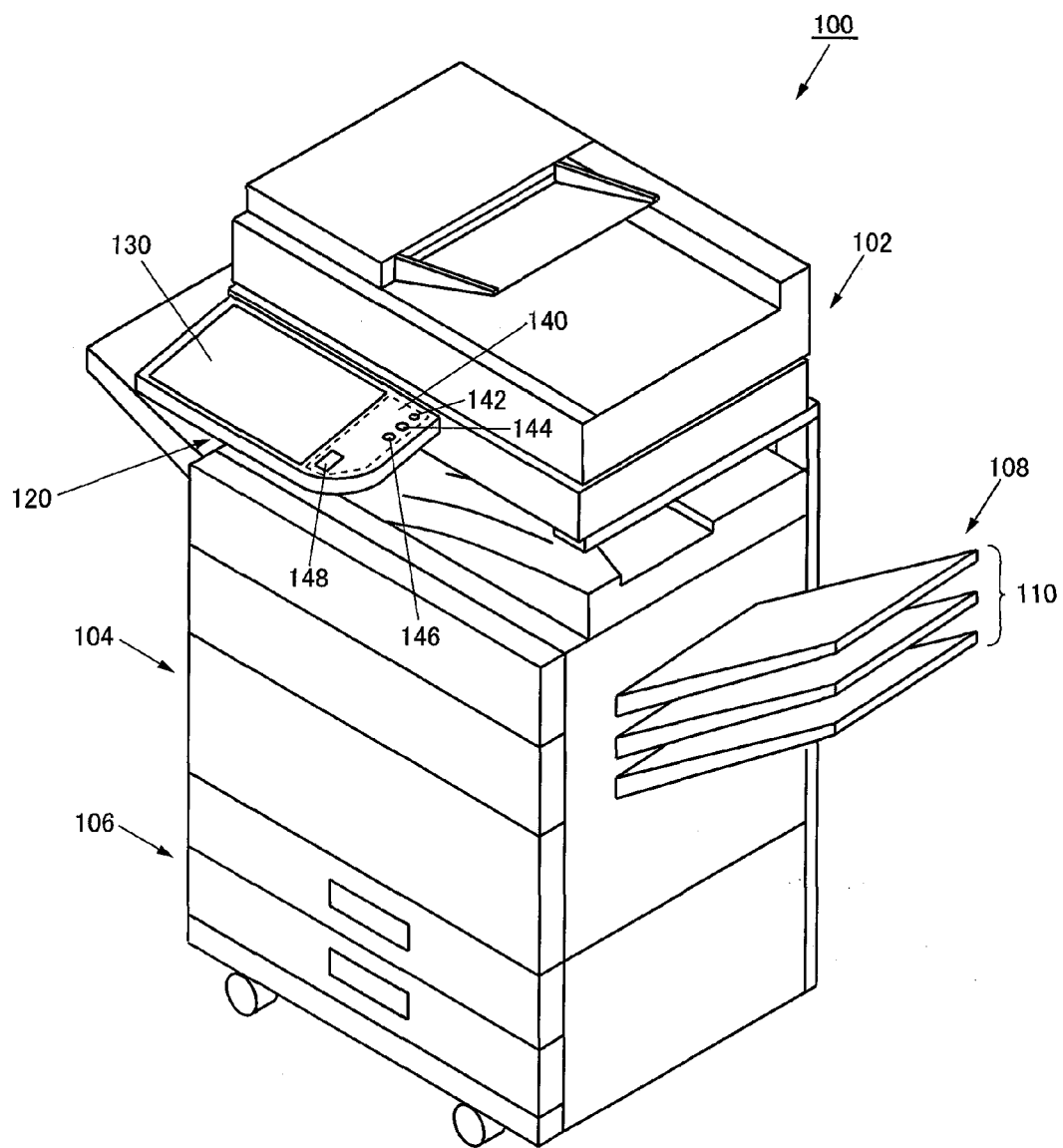
FIG. 1 is a perspective view showing an appearance of the image forming apparatus in accordance with an embodiment of the present invention.

In the following description, the same components are denoted by the same reference characters. Their names and functions are also the same. Therefore, detailed description thereof will not be repeated.

The electronic device in accordance with an embodiment of the present invention is an image forming apparatus as one type of image processing apparatuses. The display device in accordance with the present invention may be applicable to an image processing apparatus or an electronic device other than the image forming apparatus. The electronic device in accordance with the present embodiment may be any apparatus having a plurality of operational modes including an operation console displaying process request information such that the user can easily obtain the process request information necessary for the user even when the user does not remember screen image configuration, when the operational mode of the device is switched and the screen image on the operation console is switched accordingly.

The image forming apparatus in accordance with the present embodiment includes a touch-panel display allowing operation by the gesture operation method and the touch-operation method not using the gesture operation. The apparatus, however, may include a touch-panel display allowing touch operation only.

The image forming apparatus forms an image on a sheet of recording paper by electro-photography. The image forming apparatus includes, as operational modes, copy mode, FAX mode, document filing mode (a mode in which a scanned image is stored in a storage device in the image forming apparatus) and mail mode (a mode in which a scanned image is transmitted attached to an electronic mail). The image forming apparatus may further include network printer mode. The present invention is not limited to the above, and it may be any image forming apparatus including at least two of the four operational modes, that is, copy mode, FAX mode, document filing mode and mail mode, in which screen image is switched for each mode. In the image forming apparatus, a process request related to image formation is input by the user pressing a software button displayed on the touch-panel display. In the image forming apparatus, information related to image forming process regarding requests input by the user (software buttons such as a copy start key and a scan start key) is always displayed at the same position of the touch-panel display even when the operational mode is different. The printing method is not limited to electro-photography.

[Image Forming Apparatus: Function]

Figure 2:
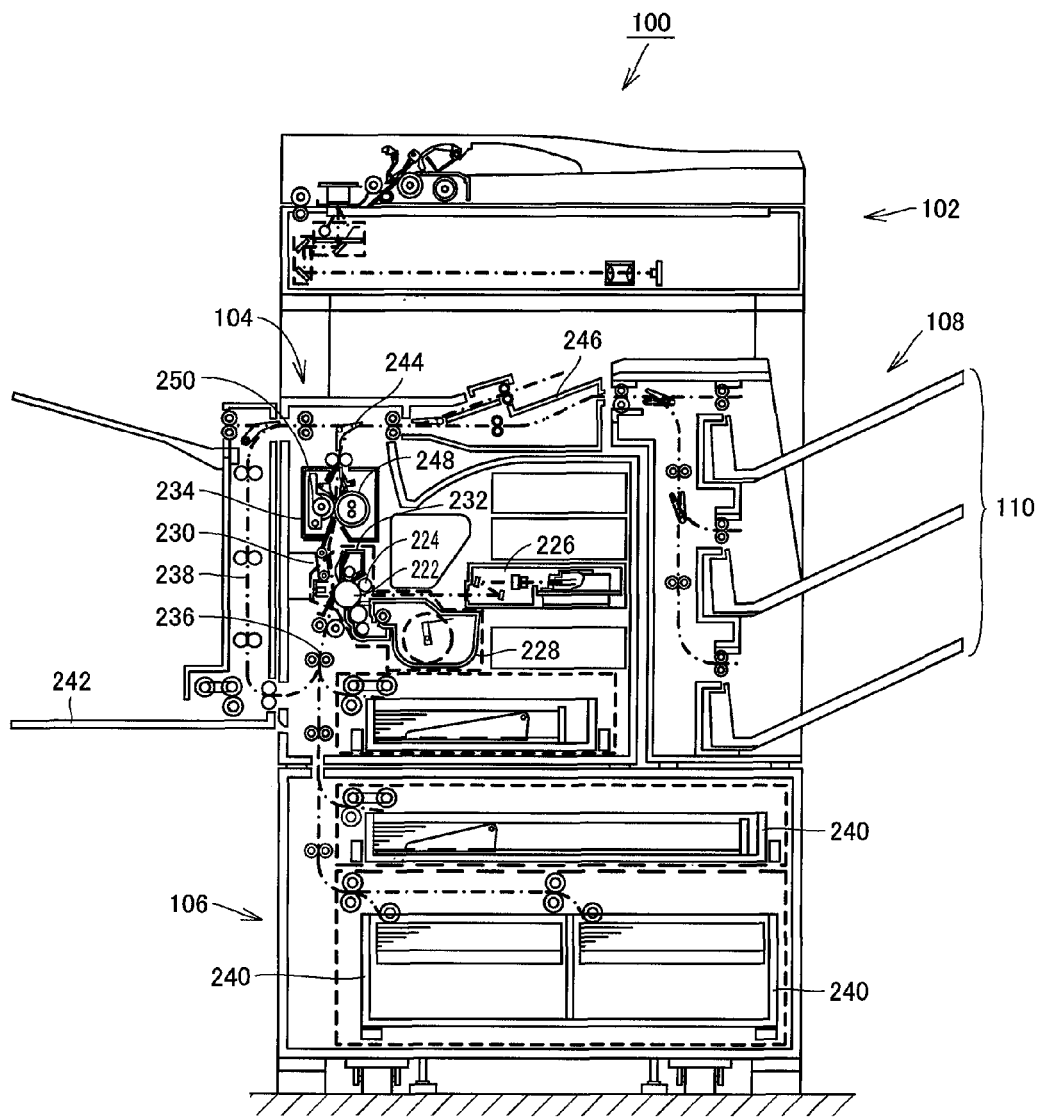
FIG. 2 schematically shows an internal configuration of the image forming apparatus shown in FIG. 1.
Figure 3:
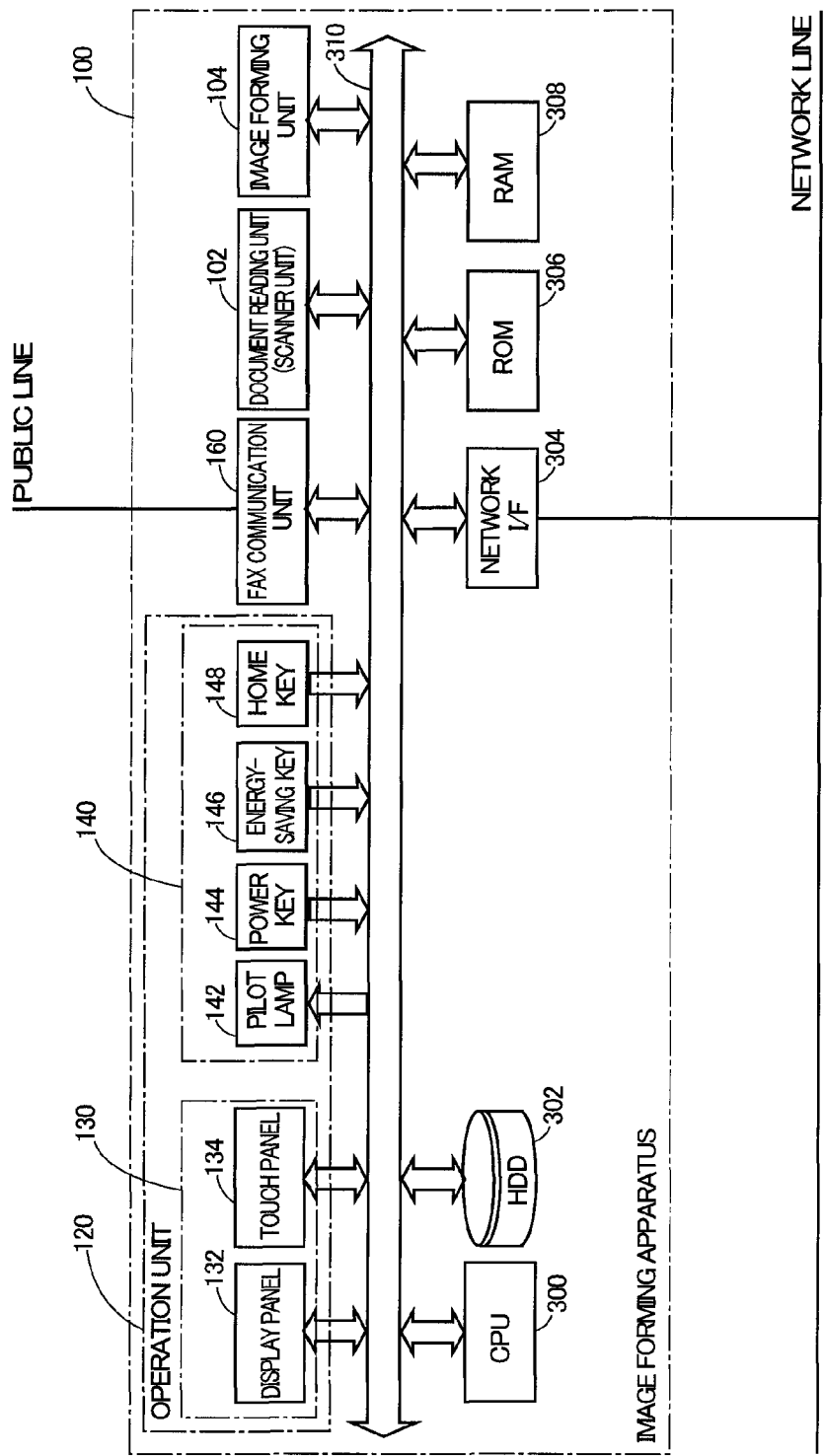
FIG. 3 is a functional block diagram showing a hardware configuration of the image forming apparatus shown in FIG. 1.

Referring to FIGS. 1 to 3, an image forming apparatus 100 in accordance with the present embodiment will be described.

Referring to FIGS. 1 to 3, image forming apparatus 100 includes a document reading unit 102, an image forming unit 104, a paper feed unit 106, a paper discharge unit 108 and an operation unit 120. Operation unit 120 includes a touch-panel display 130 and a display operation unit 140. Touch-panel display 130 includes a display panel 132 formed of a liquid crystal panel or the like, and a touch-panel 134 arranged on display panel 132, for detecting a position pressed by the user's finger. Display operation unit 140 includes a pilot lamp 142, a power key 144, an energy-saving key 146, and a home key 148 for returning the display screen image on touch-panel display 130 to a home screen image for selection of an operational mode.

As described above, image forming apparatus 100 in accordance with the present embodiment is provided with touch-panel display 130 as a main operation device, and, in addition, with display operation unit 140 including hardware keys and a pilot lamp. The keys (power key 144, energy-saving key 146 and home key 148) of display operation unit 140 are hardware buttons, different from the software buttons realized by touch-panel display 130. It is noted that image forming apparatus 100 is not limited to one having display operation unit 140 as such, and it may be provided only with touch-panel display 130. The invention is applicable to any apparatus in which the display is switched to an initial screen image of a selected operational mode, when the user selects the operational mode on the home screen image displayed on touch-panel display 130. The operational modes of image forming apparatus 100 as such will be described.

—Copy Mode—

In the following, an operation in the copy mode will be described. In the copy mode, mainly document reading unit (also referred to as a scanner unit) 102 and image forming unit 104 operate.

In image forming apparatus 100, a document placed on a platen is read by document reading unit 102 as image data. The read image data is input to CPU (Central Processing Unit) 300 implemented, for example, by a microcomputer shown in FIG. 3. The image data is subjected to various image processing operations here, and the resulting image data is output to image forming unit 104.

Image forming unit 104 is for printing an image of the document represented by the image data on a recording medium (in most cases, on a sheet of recording paper). Image forming unit 104 includes a photoreceptor drum 222, a charger 224, a laser scanning unit (hereinafter denoted as LSU) 226, a developer 228, a transfer device 230, a cleaning device 232, a fixing device 234 and a neutralizer, not shown.

In image forming unit 104, a main feeding path 236 and a reverse feeding path 238 are provided, and a sheet of recording paper fed from paper feed unit 106 is fed along main feeding path 236. Paper feed unit 106 draws out sheets of recording paper stacked on a paper feed cassette 240 or on a manual feed tray 242 one by one, and feeds the sheet of paper to main feeding path 236 of image forming unit 104.

While the sheet of recording paper is fed along main feeding path 236 of image forming unit 104, the sheet passes between photoreceptor drum 222 and transfer device 230, and further passes through fixing device 234, whereby printing is done on the sheet of recording paper.

Photoreceptor drum 222 rotates in one direction, and its surface is cleaned by cleaning device 232 and the neutralizer and, thereafter, uniformly charged by charger 224.

LSU 226 modulates the laser beam based on the image data to be printed, and repeatedly scans the surface of photoreceptor drum 222 with the modulated laser beam in a main scanning direction, whereby an electrostatic latent image is formed on the surface of photoreceptor drum 222.

Developer 228 develops the electrostatic latent image by supplying toner to the surface of photoreceptor drum 222, and thus, a toner image is formed on the surface of photoreceptor drum 222.

Transfer device 230 transfers the toner image on the surface of photoreceptor drum 222 to the sheet of recording paper passing between transfer device 230 and the photoreceptor drum 222.

Fixing device 234 includes a heating roller 248 and a pressure roller 250. Heating roller 248 is for heating the sheet of recording paper. Pressure roller 250 is for pressing the sheet of recording paper. As the sheet of recording paper is heated by heating roller 248 and pressed by pressure roller 250, the toner image that has been transferred to the sheet of recording paper is fixed on the sheet. A heater is heated by electric power supplied to fixing device 234 and controlled such that temperature of heating roller 248 attains to an appropriate temperature for fixing. When operational mode is changed to the energy saving mode, power supply to the heater is, for example, stopped or reduced.

At a position of connection between main feeding path 236 and reverse feeding path 238, a separation pawl 244 is arranged. When printing is done only on one side of the sheet of recording paper, separation pawl 244 is so positioned that the sheet of recording paper fed from fixing device 234 is guided to paper discharge tray 246 or a paper discharge unit 108.

When printing is done on both sides of the sheet of recording paper, separation pawl 244 is turned to a prescribed direction, so that the sheet of recording paper is guided to reverse feeding path 238. The sheet of recording paper passes through reverse feeding path 238, turned upside-down and again fed to main feeding path 236, and while it is again fed along main feeding path 236, printing is done on its rear surface, and thereafter the sheet is guided to paper discharge tray 246 or to paper discharge unit 108.

The sheet of recording paper printed in the above-described manner is guided to paper discharge tray 246 or to paper discharge unit 108, and discharged to paper discharge tray 246 or to any of paper discharge trays 110 of paper discharge unit 108.

Paper discharge unit 108 may perform a process of sorting a plurality of printed sheets of paper to be output to different discharge trays 110, a process of punching each sheet of recording paper or a process of stapling the sheets of recording paper. Assume that a number of copies of the printing are to be prepared. In that case, sheets of recording paper are sorted and discharged to paper discharge trays 110 such that each tray 110 contains each set of printed sheets, and the set of printed sheets in each tray 110 is stapled or punched.

—Facsimile Mode—

In the following, an operation in the facsimile mode will be described. In the facsimile mode, the facsimile function is realized by transmission and reception operations. In the transmission operation, document reading unit (scanner unit) 102 and FAX communication unit 160 mainly operate. In the reception operation, FAX communication unit 160 and image forming unit 104 mainly operate.

—Transmission Operation

In image forming apparatus 100, the facsimile mode is designated. A document placed on the platen is read by document reading unit 102 as image data. The read image data is input to CPU 300 implemented, for example, by a microcomputer shown in FIG. 3, the image data is subjected to various image processing operations here, and the resulting image data is output to a FAX communication unit (FAX communication unit 160 of FIG. 3).

FAX communication unit 160 of image forming apparatus 100 on the transmitting side connects a designated transmitting side line to a designated transmission destination. FAX communication unit 160 converts the image data to communication data in compliance with facsimile transmission standard, and transmits the converted data to a facsimile machine (such as an image forming apparatus having the facsimile function) on the receiving side.

—Communication Operation

When the line is connected, a FAX communication unit of the image forming apparatus on the receiving side detects a communication request signal from FAX communication unit 160 of image forming apparatus 100 on the transmitting side, and transmits an acknowledgement signal. Thereafter, by way of example, FAX communication units on the transmitting and receiving sides pass performance information supported by transmitting side and receiving side, determine highest possible speed of communication and method of coding/code correction of image data, and set the method of communication of modems. Then, using the image signal format in compliance with the communication method, data is transmitted from FAX communication unit 160 of image forming apparatus 100 on the transmitting side to the FAX communication unit of image forming apparatus on the receiving side. When transmission ends, the line is disconnected.

—Reception Operation

When image forming apparatus 100 is on the receiving side, FAX communication unit 160 converts the received data to image data and passes the data to an image forming unit 104. The received data may be converted to image data at the image forming unit 104. The image forming unit 104 prints an image of a document represented by the image data converted from the received data on a sheet of recording paper, in a manner similar to the operation in the copy mode described above.

—Document Filing Mode—

In the following, an operation in the document filing mode will be described. In the document filing mode, mainly document reading unit (scanner unit) 102 and image forming unit 104 operate.

In image forming apparatus 100, a document placed on the platen is read by document reading unit 102 as image data. The read image data is input to CPU 300 and subjected to various image processing operations here. The resulting image data is stored in a storage device (hard disk drive 302 as will be described later) provided in image forming apparatus 100.

The stored image data is read from the hard disk drive by the user designating the file name, and printed on a sheet of recording paper in the similar manner as in the copy mode described above.

—Mail Mode (Scan-to-Mail)—

In the following, description will be given on an operation in the mail mode. In the mail mode, document reading unit (scanner unit) 102 and network interface 304 mainly operate.

The image communication mode provided in image forming apparatus 100 includes the facsimile mode and the electronic mail communication mode (mail mode, scan-to-mail). In the facsimile mode, image data is transmitted/received by public line through FAX communication unit 160 as described above. In the electronic mail communication mode (mail mode, scan-to-mail), the image data is transmitted/received by the Internet line in the form of an attachment to an electronic mail, through network interface 304. Image forming apparatus 100 may further include Internet facsimile mode or image transfer mode (scan-to-PC folder). In the Internet facsimile mode, the image data is transmitted/received by the Internet line through network interface 304. In the image transfer mode (scan-to-PC folder), the image data is transferred to a folder of a specific personal computer (PC) using a network line.

In image forming apparatus 100, a document placed on a platen is read by document reading unit 102 as image data. The read image data is input to CPU 300, and subjected to various image processing operations here. The resulting image data is transmitted, attached to an electronic mail.

Different from the facsimile mode in which a telephone number of transmission destination is designated, a mail address of the transmission destination is designated in the mail mode.

[Image Forming Apparatus: Control Block Configuration]

Referring to FIG. 3, image forming apparatus 100 further includes operation unit 120, ROM (Read Only Memory) 306, a hard disk drive (hereinafter denoted as HDD) 302, and an RAM (Random Access Memory) 308. Operation unit 120 allows setting of functions related to the copy mode, facsimile mode, document filing mode and mail mode. ROM 306 stores programs and the like. HDD 302 is a non-volatile storage area capable of storing programs and data even when power is cut off. RAM 308 provides a storage area when a program is executed.

Image forming apparatus 100 further includes a bus 310 and CPU 300. Document reading unit 102, image forming unit 104, FAX communication unit 160, operation unit 120, ROM 306, HDD 302, RAM 308, and CPU 300 are connected to bus 310. CPU 300 realizes general functions as the image forming apparatus.

HDD 302 stores files of image data of documents scanned by image forming apparatus 100, folder by folder, together with date and time of saving and name of the user who saved. Further, HDD 302 stores initial screen image data of each operational mode.

ROM 306 stores programs and data necessary for controlling operations of image forming apparatus 100. The initial screen image data of each operational mode may be stored as data to be stored together with the program in ROM 306. CPU 300 controls image forming apparatus 100 in accordance with the programs and data stored in ROM 306, and executes control related to various functions of image forming apparatus 100.

As shown in FIG. 3, a public line is connected for transmitting/receiving image data, to FAX communication unit 160 of image forming apparatus 100. To network interface 304, a network line is connected. To the network line, a computer or the like using image forming apparatus 100 as a network-supported printer may be connected. To the network line, a computer or the like identified by a URL (Uniform Resource Locator) designated through the Internet may be connected. When connected to the Internet, image forming apparatus 100 can obtain necessary information through the Internet.

RAM 308 provides a function of a working memory for temporarily storing results of operations and processes by CPU 300, and a function of a frame memory for storing image data.

CPU 300 controls document reading unit 102, image forming unit 104, ROM 306, HDD 302, RAM 308 and touch-panel display 130 and display operation unit 140 forming operation unit 120, by executing a prescribed program or programs. Operation unit 120 communicates with CPU 300 through an input/output interface.

Operation unit 120 is formed of a plate-shaped panel provided in an inclined manner to be easily viewable by the user. On a surface of operation unit 120, touch-panel display 130 is provided on the left side area, and display operation unit 140 (pilot lamp 142 and power key 144, energy-saving key 146 and home key 148 as hardware buttons) is provided on the right side area. Touch-panel display 130 and display operation unit 140 form operation unit 120 as one integrated body as a whole.

As described above, touch-panel display 130 is formed of display panel 132 and touch-panel 134 arranged on display panel 132. On display panel 132 of touch-panel display 130, a home screen image allowing selection of an operational mode of image forming apparatus 100, current state of image forming apparatus 100, status of destination designation, and status of job processing are displayed. On a display area of display panel 132, selection buttons as software buttons are displayed. When a portion where the selection button is displayed is pressed, the pressed position is detected by the touch-panel 134. By comparing the display position of the selection button and the position where the touch-panel 134 is pressed using a program, selection of an operational mode, setting of a function, and instruction of an operation of image forming apparatus 100 become possible. In addition to such a touch operation (command input operation based on the position of pressing by the user), image forming apparatus 100 also allows gesture operation (command input operation based on trajectory of operation by the user) as described above.

Pilot lamp 142 of display operation unit 140 is, for example, an LED (Light Emitting Diode). It is turned on/off (/flickered) under the control of CPU 300. When the user presses power key 144 provided separate from a main power switch, image forming apparatus 100 makes a transition from a standby mode (in which, for example, only the FAX receiving operation is possible with the main power on) to a normal mode, in which every operational mode of image forming apparatus 100 is usable. In this state, pilot lamp 142 is turned and kept on. If a predetermined time passes without any user operation, or if the user presses energy-saving key 146, image forming apparatus 100 makes a transition from the normal mode to the energy saving mode. In the energy saving mode, only some of the operational modes of image forming apparatus 100 can be used. In this state, pilot lamp 142 flickers. Further, if the user presses energy-saving key 146 in the energy saving mode, the image forming apparatus 100 makes a transition from the energy saving mode to the normal mode. Home key 148 is a hardware key for returning the display of touch-panel display 130 to the initial state (home screen image). The processes performed when power key 144, energy-saving key 146 and home key 148 are pressed are not limited to the above.

In a hardware button (power key 144, energy-saving key 146 and home key 148) of display operation unit 140, a key lamp or key lamps, which is/are turned on/off (/flickered) under the control of CPU 300, may be embedded. By way of example, the key lamps provide a light ring on the edge of a circular key, or the key lamp lights a central portion of the key. The key lamp is turned on at a timing when hardware buttons are allowed to be used as the operation device (at a timing when a process is executed if the hardware button is used).

Image forming apparatus 100 in accordance with the present embodiment includes the four operational modes (copy mode, facsimile mode, document filing mode and mail mode) as described above. On touch-panel display 130, software buttons for setting functions in respective operational modes are displayed, and buttons for setting a destination or a preview as an expected image, for example, are displayed as needed.

In different operational modes, different screen images are displayed on touch-panel display 130. In order to allow the user to easily find a required piece of information even in such a state, touch-panel display 130 is divided into a plurality of areas (with the size of each area made variable), and pieces of information are displayed in these areas. More specifically, in image forming apparatus 100, if an operational mode is selected on the home screen image of touch-panel display 130 provided as a main display operation device, the initial screen image of each operational mode is displayed. In the initial screen image, a basic layout is such that the screen image is divided into five areas ("system area," "function selecting area," "preview area," "action panel area," and "task trigger area") and arranged appropriately. Therefore, by a user operation starting from an upper left portion to a lower right portion, easy setting is possible (since the flow lines of the user's viewpoint and finger tip are similar to those in a conventional device not provided with such a large touch-panel display 130). Further, concepts of the pieces of information displayed on respective ones of the five areas are common among different operational modes, so that function setting operation and process request operation (particularly, the process request operation) by the user without any confusion become possible even in different operational modes. In the following, the arrangement of basic layout will be described.

[Basic Layout Arrangement]

Figure 4:
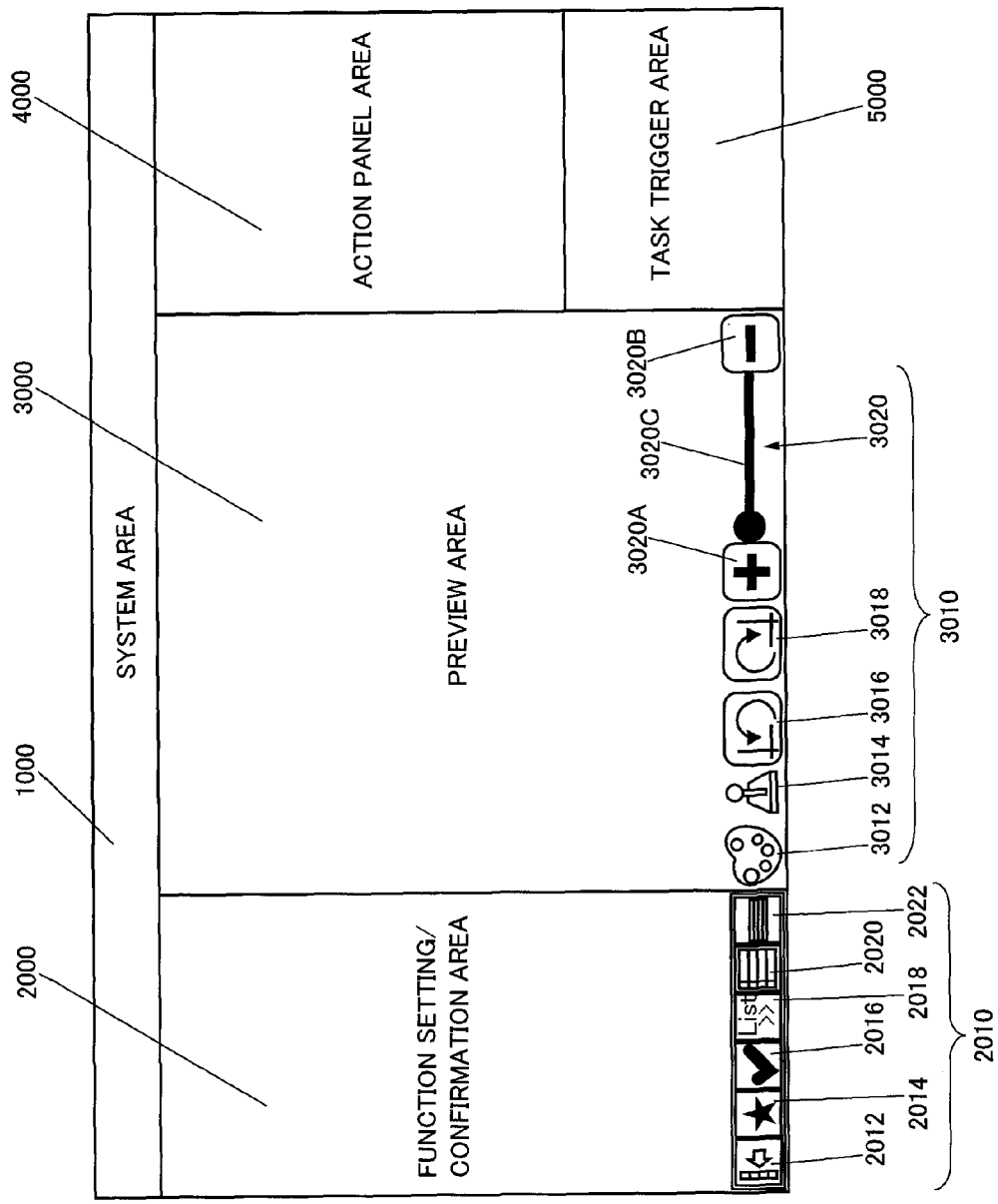
FIG. 4 shows display areas of a touch-panel display of the image forming apparatus shown in FIG. 1.

FIG. 4 shows a basic layout on touch-panel display 130 of image forming apparatus 100. Referring to FIG. 4, the basic layout of landscape-oriented touch-panel display 130 (for example, of 1024 pixels×600 pixels) includes system area 1000, preview area 3000, function setting/confirmation area 2000 (hereinafter referred to as function selecting area 2000), action panel area 4000 and task trigger area 5000. Specifically, system area 1000 is arranged at the uppermost portion of the screen image, and preview area 3000 is arranged at the center of the screen image. Function selecting area 2000 is placed on the left side of preview area 3000, and action panel area 4000 is placed on the right side of preview area 3000. Task trigger area 5000 is placed on the lower right side of preview area 3000. The number of areas is not limited to five, the arrangement on the left and right sides is not limited to the above. By way of example, the left/right arrangement of areas may be reversed, depending on the dominant hand of the user. System area 1000 may be positioned at the lowermost portion of the screen image.

On system area 1000, pieces of information related to the current status and state of image forming apparatus 100 are displayed. By way of example, on system area 1000, an operational mode name, an interruption key, a log-in user name, status of a currently processed job, state of use of an internal memory, time and the like are displayed.

On function selecting area 2000, a function selection menu (icons, buttons and the like) operated by the user for setting each function, switching display and confirming setting, is displayed. The manner of display of function selecting area 2000 is changed depending on whether it is in an icon mode, a regular mode or an express mode. In the icon mode, only the icons for setting functions are displayed in function selecting area 2000, so as to ensure the widest preview area 3000. In the express mode, a large screen image allowing setting of functions at one time is displayed in function selecting area 2000, while preview area 3000 is made the smallest. In the regular mode, the size of preview area 3000 is medium size between that in the icon mode and that in the express mode. In function selecting area 2000, function names are displayed in text, together with the icons for setting functions.

Switching among the icon mode, regular mode and express mode is done based on an operation by the user. Specifically, the size of preview area 3000 is changed in accordance with the user's operation. Since icons can transmit pieces of information to the user in a small area, it is preferred to prepare icons for all functions, so as to allow display of preview area 3000 in a large size.

At a lower portion of function selecting area 2000, a group of change buttons 2010 are provided, for changing style of display of function selecting area 2000. Among the group of change buttons 2010, an icon mode entering button 2012, a "favorite" button 2014, a check button 2016, a list button 2018, a regular mode entering button 2020, and an express mode entering button 2022 are provided. Icon mode entering button 2012 is for displaying function selecting area 2000 in the icon mode. Favorite button 2014 is for displaying functions registered as "favorites." Check button 2016 is for displaying a function of which setting has been changed. List button 2018 is for displaying a list of all functions that can be set in the selected operational mode. Regular mode entering button 2020 is for displaying function selecting area 2000 in the regular mode. Express mode entering button 2022 is for displaying function selecting area 2000 in the express mode.

If a large amount of information is to be displayed on function selecting area 2000, pieces of information are displayed in an upward/downward scrollable manner. In that case, the group of change buttons 2010 are not scrolled but constantly displayed at the lowermost portion of function selecting area 2000.

In preview area 3000, an image of expected document output (finished form) is displayed. Specifically, an image is displayed using dummy data or scanned data. Every time the user designates the manner of finish, the image displayed on preview area 3000 changes. Preview area 3000 has two display modes. One is a virtual mode before scanning, in which finished form of a dummy image is displayed. Another display mode is a scan-in mode after scanning, in which finished form of the actual image is displayed. The virtual mode has two types, that is, before setting an original document and after setting an original document.

At a lower portion of preview area 3000, a group of preview changing buttons 3010 are provided, for changing the style of display of preview area 3000. Among the group of preview changing buttons 3010, a left-turn button 3016, a right-turn button 3018, and a zoom bar 3020 are provided. Left-turn button 3016 turns the preview 90 degrees to the left, and right-turn button 3018 turns the preview 90 degrees to the right. In addition to these buttons, a color changing button 3012 and preview operation button 3014, for example, are provided.

When left-turn button 3016 is touch-operated once, the preview is turned 90 degrees to the left, and when touch-operated twice, the preview is turned 180 degrees to the left (vertically flipped). Similarly, when the image of finished document displayed on the preview area is gesture-operated (when the document image is rotated 180 degrees counter-clockwise by one's finger), the preview is turned 180 degrees to the left and vertically flipped.

When right-turn button 3018 is touch-operated once, the preview is turned 90 degrees to the right, and when touch-operated twice, the preview is turned 180 degrees to the right (vertically flipped). Similarly, when the image of finished document displayed on the preview area is gesture-operated (when the document image is rotated 180 degrees clockwise by one's finger), the preview is turned 180 degrees to the right and vertically flipped.

When a plus button 3020A of zoom bar 3020 is touch-operated or if bar 3020C is gesture-operated (slid) to the side of plus button 3020A, the preview is displayed in an enlarged size. Similarly, when the image of finished document displayed on the preview area is gesture-operated (when the document image is pinched-out/pinched-open by finger tips), the preview is displayed in an enlarged size.

When a minus button 3020B of zoom bar 3020 is touch-operated or if bar 3020C is gesture-operated (slid) to the side of minus button 3020B, the preview is displayed in a reduced size. Similarly, when the image of finished document displayed on the preview area is gesture-operated (when the document image is pinched-in/pinched-close by finger tips), the preview is displayed in a reduced size.

If the number of pages of the document image to be displayed on preview area 3000 is large, a display page selection button (a page number input button, page feed button, page return button, single page display button, plural page display button or the like) that can be touch-operated may be displayed. Page feed and page return of the previewed document is also possible by a gesture-operation (flick) of the document image. If the document image displayed on preview area 3000 is large, a scroll bar that can be touch-operated or gesture-operated may be displayed.

On action panel area 4000, pieces of information related to assistance, guidance and suggestion related to the operation are displayed. On action panel area 4000, if, for instance, a user selects a specific function, functions related to the selected function may be displayed, other functions related to the selected function in object-oriented manner may be displayed, or functions selected in the past by the user or a user of a group to which the user belongs in relation to the selected function may be displayed as "recommended functions."

On task trigger area 5000, trigger items operated by the user to actually operate image forming apparatus 100 when all settings are done for the operational mode are displayed. For instance, in the copy mode, a start key for starting the process for forming an image on a sheet of recording paper (the process for forming data in the final form), or a scan-in key for starting a process for scanning and obtaining image data to be formed on the sheet of paper (the process for forming data in the intermediate form) are displayed. In an operational mode involving printing (other than facsimile transmission), information related to run out of consumables is also displayed on task trigger area 5000, since it leads to a task failure. Whenever task trigger area 5000 is displayed on touch-panel display 130, it is displayed on the lower right area of touch-panel display 130, regardless of the operational mode.

In task trigger area 5000, it is preferred to display the start button only when the state allows pressing of the start button. The state that allows pressing of the start button refers to a state in which all settings have been done, and consumables (recording paper and toner) are available, in the operational mode involving printing. In the facsimile mode (transmission) as an operational mode not involving printing, it is a state in which settings of all transmission parameters including a destination have been done.

The positions where these five areas are arranged are not changed even when the operational mode is changed (not changed in the initial screen image of any operational mode). Similar to the switched display in the icon mode/regular mode/express mode of function selecting area 2000 (and preview area 3000), the size of each area is changed, reduced/enlarged in the lateral direction (longitudinal direction) of touch-panel display.

These five areas are arranged in consideration of the flow line of user's viewpoint and the flow line of user's operation, in addition to the user interface of conventional devices (for example, in most of the conventional apparatuses, a start key as a hardware button is arranged on the right side or lower right side of the operation unit). With such an arrangement, the user's viewpoint moves from upper left to lower right, and the user operation (finger tip of the dominant hand) moves from upper left to lower right. This advantageously enables a user-friendly operation. In image forming apparatus 100, the sheet of recording paper on which an image has been formed is discharged from the left to the right side, to discharge tray 110 provided on the right side (when viewed from the front side) of image forming apparatus 100 or to discharge tray 246 in the body. Since the sheet of recording paper is discharged in this direction and touch-panel display 130 is provided on the front left side of image forming apparatus 100, it is easy to pick-up a sheet of recording paper discharged to discharge tray 110 or to discharge tray 246 in the body, using the hand that pressed the start button on task trigger area 5000 provided on the lower right area of touch-panel display 130.

The present embodiment is characterized in that task trigger area 5000 is displayed at the same position of touch-panel display 130 even when the operational mode is different, and the contents displayed therein are related to the trigger items operated by the user for actually operating image forming apparatus 100. Therefore, on touch-panel display 130 of image forming apparatus 100, it is not always necessary to have all four areas displayed in addition to task trigger area 5000. By way of example, when at least the preview area 3000 and task trigger area 5000 are displayed on touch-panel display 130, it is possible to operate a software button displayed on task trigger area 5000 while the finished state is confirmed by the preview image displayed on preview area 3000, so that the process can be started immediately.

For making a transition from one operational mode to another, home key 148 is pressed to display a home screen image, and thereby to select another operational mode on the home screen image. In this manner, the operational mode is switched through the home screen image.

Image forming apparatus 100 is provided with touch-panel display 130 displaying pieces of information in consideration of flow lines of user's viewpoint and user's operation. The display process on touch-panel display 130 is realized by software executed using the hardware configuration described above. The software configuration will be described.

[Software Configuration]

Figure 5:
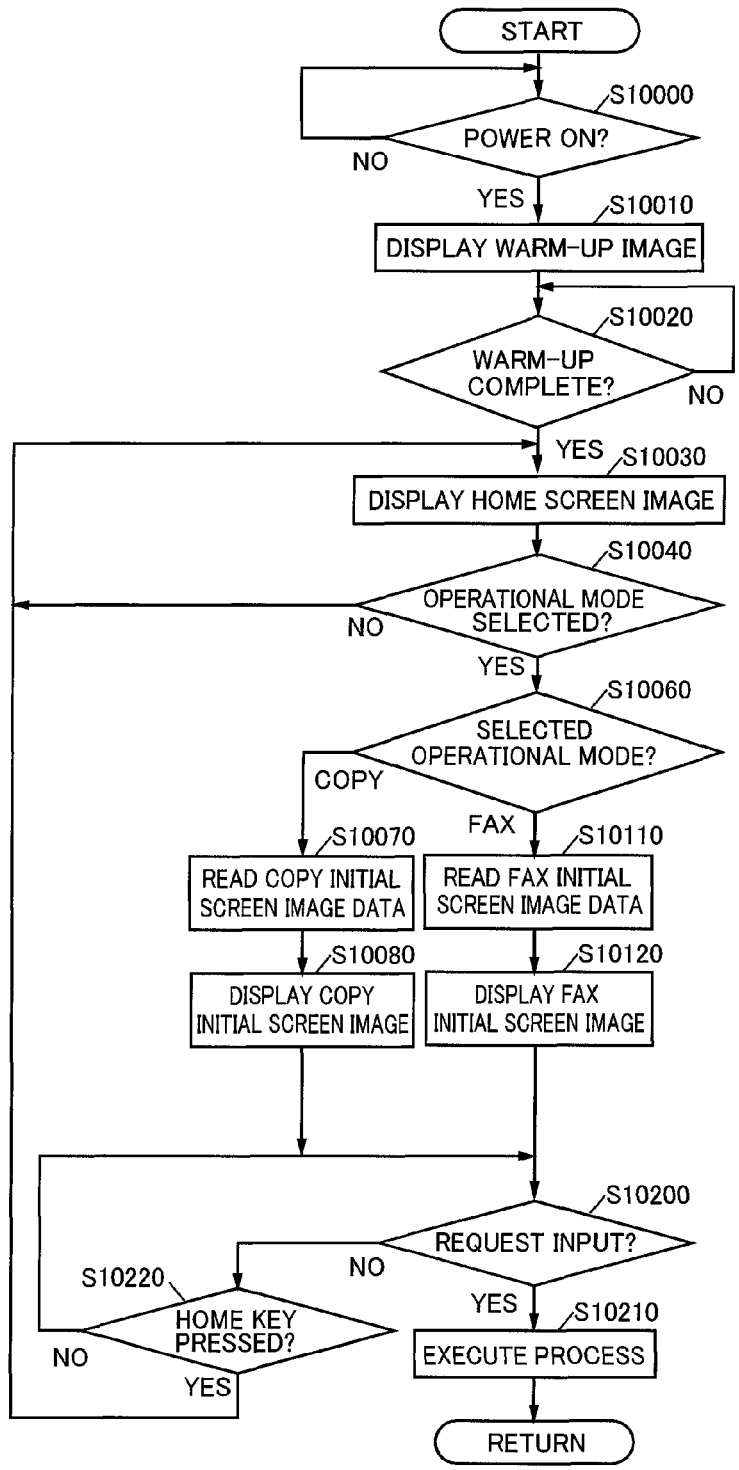
FIG. 5 is a flowchart representing a control structure of a program executed by the image forming apparatus in accordance with the embodiment of the present invention.

FIG. 5 is a flowchart representing a control structure of a program executed by CPU 300 of image forming apparatus 100. CPU 300 of image forming apparatus 100 executes, in parallel with the program, a program for realizing general functions of an image forming apparatus. The program, however, is not directly related to the characteristic portion of the present invention and, therefore, details thereof will not be described here. Of the four operational modes, only the copy mode and the FAX mode will be described in the following. It is noted, however, that image forming apparatus 100 operates not only in the copy mode and the FAX mode, and it is used with at least two operational modes switched. In both of the two operational modes, task trigger area 500 is displayed at the same position on touch-panel display 130.

Referring to FIG. 5, at step (hereinafter "step" will be denoted by 5) 10000, CPU 300 of image forming apparatus 100 (hereinafter simply referred to as CPU 300) determines whether or not image forming apparatus 100 is powered on. Here, it is assumed that the main power for operating CPU 300 has been on, and when power key 144 is pressed, CPU 300 determines that image forming apparatus 100 is powered on. The determination of YES may be made if the main power is turned on, at S10000. If it is determined that image forming apparatus 100 is powered on (YES at S10000), the process proceeds to S10010. Otherwise (NO at S10000), the process of S10000 is repeated until it is determined that image forming apparatus 100 is powered on.

At S10010, CPU 300 displays a warm-up screen image on touch-panel display 130. While the warm-up screen image is displayed on touch-panel display 130, by way of example, a system check process and the process of supplying electric power to the heater to heat heating roller 248 are executed.

At S10020, CPU 300 determines whether or not warm-up is complete. If it is determined that warm-up is complete (YES at S10020), the process proceeds to S10030. Otherwise (NO at S10020), the process of S10020 is repeated until warm-up is complete.

At S10030, CPU 300 displays the home screen image on touch-panel display 130. At S10040, CPU 300 determines whether or not an operational mode is selected. CPU 300 determines that an operational mode is selected when an icon (an icon representing an operational mode) displayed, on the home screen image is touched, tapped or double-tapped. If it is determined that an operational mode is selected (YES at S10040), the process proceeds to S10060. Otherwise (NO at S10040), the process returns to S10030, and the processes of S10030 and S10040 are executed. As to the icon operation, any gesture operation other than touching, tapping and double-tapping is not excluded. Any touch-operation or gesture-operation on touch-panel display 130 may be done. Simple description of "pressing" may refer to any of these operations.

At S10060, CPU 300 determines whether the selected operational mode is the copy mode or facsimile mode. If the selected operational mode is determined to be the copy mode (copy at S10060), the process proceeds to S10070. If the selected operational mode is determined to be the facsimile mode (FAX at S10060), the process proceeds to S10110.

At S10070, CPU 300 reads copy initial screen image data stored, for example, in HDD 302. At S10080, CPU 300 displays the initial screen image for the copy mode on touch-panel display 130 using the read copy initial screen image data. Thereafter, the process proceeds to S10200.

At S10110, CPU 300 reads FAX initial screen image data stored, for example, in HDD 302. At S10120, CPU 300 displays the initial screen image for the FAX mode on touch-panel display 130 using the read FAX initial screen image data. Thereafter, the process proceeds to S10200.

At S10200, CPU 300 determines whether or not a request is input in the selected operational mode. If it is determined that a user request has been input (YES at S10200), the process proceeds to S10210. Otherwise (NO at S10200), the process proceeds to S10220.

At S10210, CPU 300 executes the process requested by the user, in image forming apparatus 100. Then, the process ends.

At S10220, CPU 300 determines whether or not the home key is pressed. If it is determined that the home key is pressed (YES at S10220), the process proceeds to S10030. Otherwise (NO at S10220), the process returns to S10200 to determine whether or not a user request is input.

It is also possible to display a log-in screen image at the completion of warm-up (YES at S10020). Though the log-in operation after completion of warm-up is not described in the following, it is assumed that log-in is required of the user to use image forming apparatus 100.

Further, the request input by the user at S10200 may be a request before printing that does not necessarily cause the actual printing by image forming apparatus 100. Specifically, the request may include a change in the display mode of function selecting area 2000, function setting on function selecting area 2000, and a change in the manner of displaying the preview on preview area 3000. If such a request before printing is made, corresponding operation is done at S10210, and after S10210, the process returns to S10200 to wait for an input of a further request (eventually a scan request, print request or the like using the operation button displayed on the task trigger area).

[Operation]

The operation of image forming apparatus 100 in accordance with the present embodiment based on the configuration and flowchart as above will be described with reference to the exemplary displays on touch-panel display 130 shown in FIGS. 6 to 8.

—Home Screen Image Display Operation—

When the user presses power key 144 of image forming apparatus 100 (YES at S10000), the warm-up screen image is displayed on touch-panel display 130 (S10010) until warm-up is complete (NO at S10020). At this time, it is preferred that image forming apparatus 100 prepares pieces of information that can be displayed even during system check and useful for the user who is going to use image forming apparatus 100, and that the warm-up screen image including such pieces of information is displayed on touch-panel display 130.

When warm-up is complete (YES at S10020), the home screen image is displayed on touch-panel display 130 (S10030). At this time, on touch-panel display 130, a home screen image 6000 such as shown in FIG. 6 is displayed. On home screen image 6000, not all of the five areas of the layout described above are displayed. As shown in FIG. 6, on home screen image 6000, icons (icons representing operational modes) allowing selection of an operational mode are displayed on most part of touch-panel display 130, regardless of the five areas.

Figure 6:
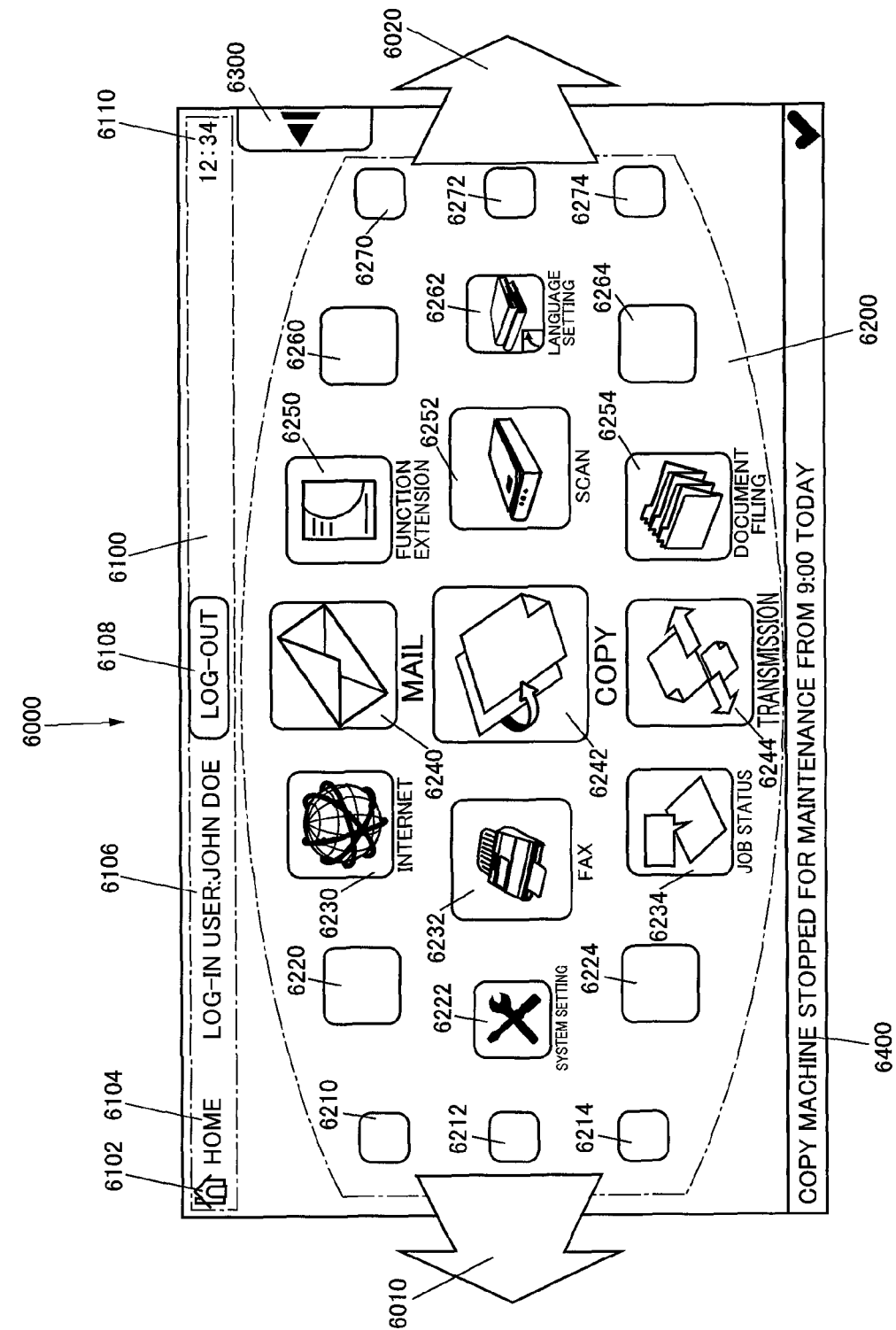

Referring to FIG. 6, home screen image 6000 includes a home system area 6100 corresponding to the system area described above, an icon display area 6200, an icon display switching tub-button 6300, and a memo display area 6400.

On home system area 6100, an area 6102 displaying an icon representing the home screen image, an area 6104 displaying the name of the displayed screen image, an area 6106 displaying the logged-in user name, an area 6108 displaying a log-out button (software button), and an area 6110 displaying the current time, are arranged.

On icon display area 6200, icons 6210-6274 representing operational modes are displayed together with the names or abbreviations of the operational modes. The name or abbreviation of the operational mode is not indispensable. In the present embodiment, there are at least four operational modes (copy mode, facsimile mode, document filing mode, and mail mode). Therefore, an icon 6242 for selecting the copy mode, an icon 6232 for selecting the facsimile mode, an icon 6254 for selecting the document filing mode and an icon 6240 for selecting the mail mode are displayed on icon display area 6200. In FIG. 6, icons for selecting other operational modes, icons for selecting other setting modes (for example, system setting and language setting), and icons for displaying other screen images (for example, job status) are also displayed.

As shown in FIG. 6, in icon display area 6200, icons on the central column (for example, icons 6240, 6242 and 6244) are displayed larger than icons on the left and right sides thereof (for example, icons 6230 and 6250 with respect to icon 6240, icons 6232 and 6252 with respect to icon 6242, and icons 6234 and 6254 with respect to icon 6244). In icon display area 6200, icons at the central row (for example, icons 6232, 6242 and 6252) are displayed larger than icons on the upper and lower sides thereof (for example, icons 6230 and 6234 with respect to icon 6232, icons 6240 and 6244 with respect to icon 6242, and icons 6250 and 6254 with respect to icon 6252). In this manner, in icon display area 6200, the icons are displayed to be horizontally and vertically symmetrical in size, with the size being the largest at the center (center at the central column).

When the user makes a flick operation to the left with his/her finger on icon display area 6200 displayed on the screen of touch-panel display 130, icons displayed on the screen move as if they flow in the direction indicated by an arrow 6010. When the user makes a flick operation to the right, icons displayed on the screen move as if they flow in the direction indicated by an arrow 6020. The distance of movement is determined, for example, in accordance with the width of movement of the finger tip in the flick operation. The distance of movement may be a prescribed distance set in advance for one flick operation. If a manner of display in which a plurality of icons are arranged on a virtual cylinder is adopted for icon display area 6200, it becomes possible to display the icons in an endless manner.

On memo display area 6400, a piece of maintenance information or the like to be notified to every user of image forming apparatus 100 is displayed.

—Operation of Displaying Initial Screen Image in Copy Mode—

If icon 6242 shown in FIG. 6 is touched, tapped or double tapped by the finger tip of a user, it is determined that the operational mode is selected (YES at S10040), and that the selected operational mode is the copy mode (copy at S10060). Using the copy initial screen image data read from HDD 302 or the like, the initial screen image of copy mode is displayed on touch-panel display 130 (S10080). By way of example, an initial screen image 7100 for the copy mode shown in FIG. 7 is displayed on touch-panel display 130. As shown in FIG. 7, copy mode initial screen image 7100 is divided into five areas of the layout described above, on which pieces of information are displayed.

Referring to FIG. 7, on system area 1000 of copy mode initial screen image 7100, an area 1102 indicating the selected operational mode (here, copy mode), an area 1104 displaying sub information related to the selected operational mode, an area 1106 displaying the logged-in user name, an area 1108 displaying a log-out button (software button), an area 1110 displaying the job status of the currently executed job, an area 1112 displaying a button related to the job status (software button), an area 1114 displaying the communication state, and an area 1116 indicating the current time, are arranged.

In area 1102, a name and/or icon representing the operational mode is displayed. It is preferred that if area 1102 is touched, tapped or double-topped, a menu showing operational modes is pulled-down, allowing switching of the operational mode (the same applies to other operational modes).

In area 1104, an interruption key (software button) is displayed as sub information. If the interruption key is touched, tapped or double-tapped, an interruption process can be executed in the copy mode.

In area 1106, job status of the currently executed job is indicated by an icon. If the job status is touched, tapped or double-tapped, detailed information of job status is displayed. Further, it is preferred to display a button or the like to stop the selected job in area 1112.

In function selecting area 2000 of copy mode initial screen image 7100, a function selection menu allowing selection by the user in the copy mode and the group of change buttons 2010 described above are displayed. In the screen image shown in FIG. 7, the function selection menu is displayed in the regular mode.

As shown in FIG. 7, the function selection menu displayed in the regular mode includes a group of icons 2100 and a group of texts 2120. In the function selection menu displayed on function selecting area 2000, corresponding to an icon 2102 for setting the number of copies, a text 2122 showing the set contents is displayed. Corresponding to an icon 2104 for setting color mode, a text 2124 showing the set contents is displayed. Corresponding to an icon 2106 for setting copy density, a text 2126 showing the set contents is displayed. Corresponding to an icon 2108 for setting copy magnification, a text 2128 showing the set contents is displayed. Corresponding to an icon 2110 for setting document type, a text 2130 showing the set contents is displayed. Corresponding to an icon 2112 for setting paper type, a text 2132 showing the set contents is displayed. Corresponding to an icon 2114 for image edition, a text 2134 showing the set contents is displayed. Corresponding to an icon 2116 for layout edition, a text 2136 showing the set contents is displayed.

As described above, further items on the function setting menu may be displayed in upward/downward scrollable manner, with the display position of group of change buttons 2010 fixed. It is possible to switch the items displayed on the function setting menu including the items hidden at the upper or lower portion and not displayed, either by the touch-operation (scroll operation) or gesture-operation (upward/downward flick operation).

Here, image edition refers to image edition of one page of document. A lower layer menu thereof includes frame erasure, print menu, watermark, user stamp and the like. The layout edition refers to image edition of a plurality of pages of the document. The lower layer menu thereof includes page collection, margin, page movement, centering and the like. The lower layer menu of the displayed function selection menu appears on touch-panel display 130 if any of icons 2102 to 2116 or texts 2122 to 2136 is touched, tapped or double-tapped.

In preview area 3000 of copy mode initial screen image 7100, an image of expected document output (finished form) 3100 and the group of preview changing buttons 3010 described above are arranged. Here, image 3100 is displayed using dummy data or scanned data. Every time the user changes the function setting menu of function selecting area 2000, image 3100 is changed and displayed on preview area 3000 (preview display is changed).

In action panel area 4000 of copy mode initial screen image 7100, pieces of information related to assistance, guidance and suggestion related to the copy operation are displayed. As shown in FIG. 7, recommended functions in the copy mode selected by the user are displayed. In action panel area 4000, an area 4100 showing the contents of displayed information, and areas 4102 to 4106 showing, as texts, the recommended functions and serving as software buttons are arranged.

When area 4102 is touched, tapped or double-tapped, detailed information of energy-saving copy is pulled-down and displayed. Here, a software button allowing transition to a function setting screen image for double-sided copy is displayed, together with a text message of, for example, "double-sided copy saves paper." At the same time, a software button allowing transition to a function setting screen image for page collection is displayed, together with a text message of "collective printing of pages saves paper." Further, a software button allowing transition to a function setting screen image for saddle stitch is displayed, together with a text message of "printing for bookbinding available."

In task trigger area 5000 of copy mode initial screen image 7100, a group of execution buttons 5100 are displayed. As the group of execution buttons 5100, a scan-in key 5102, a clear all key 5104, a monochrome start key 5106 and a color start key 5108 are arranged. These are all software buttons. Scan-in key 5102 is for operating image forming apparatus 100 to scan a document and obtain image data. Clear all key 5104 is for clearing set function or functions (for clearing set parameters related to functions). Monochrome start key 5106 is for operating image forming apparatus 100 to scan a document (or to use image data that has been already scanned and stored) and start copying in black and white. Color start key 5108 is for operating image forming apparatus 100 to scan a document (or to use image data that has been already scanned and stored) and start color copying.

Scan-in key 5102, clear all key 5104, monochrome start key 5106 and color start key 5108 arranged as the group of execution buttons 5100 are arranged close to each other. The manner of arrangement close to each other includes adjacent arrangement without any space between each other. Though these keys have substantially the same size, clear all key 5104 is smaller than other keys. The start key for starting the process for forming an image on a sheet of recording paper (the process for generating data in the final form) in the copy mode is shown as two keys, that is, monochrome start key 5106 and color start key 5108. These keys may be displayed as one start key. In that case, it is preferred to display the start key in a size different from scan-in key 5102 for starting the process for scanning and obtaining image data to be formed on a sheet of recording paper (the process for generating data in the intermediate form) (by way of example, the start key for generating data in the final form may be made larger than the scan-in key for generating data in the intermediate form). The number of buttons included in the group of execution buttons 5100 displayed on task trigger area 5000 is not limited to four. Even if the number is four, the types are not limited to the four types described above. For instance, since information related to run out of consumables may be displayed on task trigger area 5000, since it leads to a task failure.

If a user inputs a request (YES at S10200) on copy mode initial screen image 7100 displaying pieces of information in five divided areas, a copy process is executed in accordance with the request (S10210).

—Operation of Displaying Initial Screen Image in FAX Mode—

If icon 6232 shown in FIG. 6 is touched, tapped or double tapped by the finger tip of a user, it is determined that the operational mode is selected (YES at S10040), and that the selected operational mode is the FAX mode (FAX at S10060). Using the FAX initial screen image data read from HDD 302 or the like, the initial screen image of FAX mode is displayed on touch-panel display 130 (S10100). By way of example, an initial screen image 7300 for the FAX mode shown in FIG. 8 is displayed on touch-panel display 130. As shown in FIG. 8, FAX mode initial screen image 7300 is divided into five areas of the layout described above, on which pieces of information are displayed.

Referring to FIG. 8, on system area 1000 of FAX mode initial screen image 7300, an area 1302 indicating the selected operational mode (here, FAX mode), an area 1304 displaying sub information related to the selected operational mode, an area 1306 displaying the logged-in user name, an area 1308 displaying a log-out button (software button), an area 1310 displaying a volume adjustment button at the time of on-hook, an area 1312 displaying free memory space, an area 1314 displaying communication state, and an area 1316 indicating the current time, are arranged.

In area 1304, a key (software button) for adding a job is displayed, as the sub information. If the interruption key is touched, tapped or double-tapped, a process for designating a job to be added in the FAX mode can be executed.

When the volume adjustment button displayed in area 1310 is touched, tapped or double-tapped, a slide bar for adjusting volume at the time of on-hook is displayed.

In function selecting area 2000 of FAX mode initial screen image 7300, a function selection menu allowing selection by the user in the FAX mode and the group of change buttons 2010 described above are displayed. In the screen image shown in FIG. 8, the function selection menu is displayed in the regular mode.

As shown in FIG. 8, the function selection menu displayed in the regular mode includes a group of icons 2300 and a group of texts 2320. In the function selection menu displayed on function selecting area 2000, corresponding to an icon 2302 for setting the density of a FAX document, a text 2322 showing the set contents is displayed. Corresponding to an icon 2304 for setting the type of FAX document, a text 2324 showing the set contents is displayed. Corresponding to an icon 2306 for image edition, a text 2326 showing the set contents is displayed. Corresponding to an icon 2308 for layout edition, a text 2328 showing the set contents is displayed. For an icon 2310 for displaying result of FAX communication, corresponding text 2330 is displayed. For an icon 2312 for printing information of FAX transmission source on a FAX document, corresponding text 2332 is displayed. For an icon 2314 for displaying information stored in a memory box, corresponding text 2334 is displayed.

As described above, further items on the function setting menu may be displayed in upward/downward scrollable manner, with the display position of group of change buttons 2010 fixed. It is possible to switch the items displayed on the function setting menu including the items hidden at the upper or lower portion and not displayed, either by the touch-operation (scroll operation) or gesture-operation (upward/downward flick operation).

Further, in addition to the function selection menu, on function selecting area 2000 of FAX mode initial screen image 7300, a button 2340 for displaying an address book used to designate a telephone number of FAX destination is displayed.

When button 2340 is touched, tapped or double-tapped, from address books stored in image forming apparatus 100, only the destinations having FAX telephone numbers stored are extracted and a resulting address book is displayed.

In preview area 3000 of FAX mode initial screen image 7300, an image of expected document output (finished form) 3300 is arranged. Here, image 3300 is displayed using dummy data or scanned data. Every time the user changes the function setting menu of function selecting area 2000, image 3300 is changed and displayed on preview area 3000 (preview display is changed).

In addition to image 3300, in preview area 3000 of FAX mode initial screen image 7300, a button 3302 for inputting a FAX destination is displayed. When button 3302 is touched, tapped or double-tapped, a text input screen image is displayed, allowing direct input of a FAX destination, or selection of a FAX destination from an address book.

In action panel area 4000 of FAX mode initial screen image 7300, pieces of information related to assistance, guidance and suggestion related to the FAX operation are displayed. As shown in FIG. 8, recommended functions in the FAX mode selected by the user are displayed. In action panel area 4000, an area 4300 showing the contents of displayed information, and areas 4302 to 4304 showing, as texts, the recommended functions and serving as software buttons are arranged.

When area 4302 is touched, tapped or double-tapped, detailed information of multicast FAX transmission is pulled-down and displayed. When area 4304 is touched, tapped or double-tapped, detailed information related to an operation of reducing the size of data to be transmitted by FAX is pulled-down and displayed. When area 4306 is touched, tapped or double-tapped, detailed information related to an operation of saving a document to be transmitted by FAX in HDD 302 is pulled-down and displayed.

In task trigger area 5000 of FAX mode initial screen image 7300, a group of execution buttons 5300 are displayed. The group of execution buttons 5300 includes a scan-in key (software button) 5302, a clear-all key (software button) 5304, a transmission start key (software button) 5306 and a check box 5308. Scan-in key 5302 is a button for operating image forming apparatus 100 to scan a document and obtain image data. Clear all key 5304 is a button for clearing set function or functions. Transmission start key 5306 is a button for operating image forming apparatus 100 to scan a document and transmit it by FAX. Check box 5308 is used for designating direct transmission. Check box 5308 is not indispensable.

Except for the check box 5308 that is not indispensable, scan-in key 5302, clear all key 5304 and transmission start key 5306 arranged as the group of execution buttons 5300 are arranged close to each other. As to the size of these keys, transmission start key 5306, scan-in key 5302 and clear all key 5304 are made smaller in this order. Transmission start key 5306 for starting the process of executing transmission (the process for generating data in the final form) is larger than scan-in key 5302 for starting the process for scanning and obtaining the image data to be transmitted (the process for generating data in the intermediate form). Clear all key 5304 is close to other two keys. Specifically, scan-in key 5302 and clear all key 5304 are close to each other in the lateral direction, and transmission start key 5306 and clear all key 5304 are close to each other in the longitudinal direction. The number of buttons included in the group of execution buttons 5300 displayed on task trigger area 5000 is not limited to three. Even if the number is three, the types are not limited to the three types described above. For instance, other keys including check box 5308 mentioned above may be arranged.

If a user inputs a request (YES at S10200) on FAX mode initial screen image 7300 displaying pieces of information in five divided areas, a FAX process is executed in accordance with the request (S10210).

—Task Trigger Area in Initial Screen Images in Other Modes—

In the following, the display of task trigger area in the initial screen images in the mail mode and in the document filing mode will be described.

In task trigger area 5000 in the initial screen image for the mail mode, a group of execution buttons as described below is displayed.

As the group of execution buttons in the initial screen image for the mail mode, a scan-in key (software button), a clear all key (software button) and a transmission start key (software button) are arranged. The scan-in key is a button for operating image forming apparatus 100 to scan a document and to obtain image data. The clear all key is a button for clearing set functions. The transmission start key is a button for operating image forming apparatus 100 to execute a process for scanning a document and sending it as an attachment to a mail. The group of execution buttons in the mail mode corresponds to the group of execution buttons 5300 shown in FIG. 8, not including check box 5308 (and the text display of "SEND DIRECTLY").

In task trigger area 5000 in the initial screen image for the document filing mode, a group of execution buttons as described below is displayed.

As the group of execution buttons in the initial screen image for the document filing mode, a print start key (software button) and a check box are arranged. The print start key is a button for operating image forming apparatus 100 to print a document. The check box is used for erasing a file from HDD 302 after printing.

EFFECTS

As described above, in the image forming apparatus in accordance with the present embodiment, different initial screen images are displayed on the touch-panel display when operational modes are switched. Here, the touch-panel display is divided into a plurality of display areas, and pieces of information having common concepts are displayed in each of the divided areas. Therefore, it is possible for the user to easily find a necessary piece of information, whereby operability can be improved.

Specifically, in the initial screen image, the basic layout is such that the screen image is divided into five areas ("system area," "function selecting area," "preview area," "action panel area," and "task trigger area") and arranged appropriately. Therefore, by a user operation starting from an upper left portion to a lower right portion, easy setting is possible in each mode. Since the flow lines of the user's viewpoint and finger tip similar to those in a conventional device not provided with such a large touch-panel display 130 (having a group of hardware buttons including ten or more keys on the touch-panel display) are realized, confusion of the user can be prevented even when image forming apparatus is changed from a conventional one to the apparatus in accordance with the present embodiment. Further, concepts of the pieces of information displayed on respective ones of the five areas are common among different operational modes, so that smooth operation by the user without any confusion becomes possible even in different operational modes. Particularly, since the task trigger area (an area on which trigger items operated by the user for actually operating image forming apparatus 100 are displayed) is arranged to be always displayed on the lower right side of touch-panel display, a series of operations made by the user always ends in the lower right direction. Therefore, the flow line of user's view point and the flow line of user's fingertip become continuous to the next operation of confirming a sheet of recording paper discharged from image forming apparatus 100.

The position of task trigger area is set appropriately, considering the position of operation unit in the image forming apparatus, the discharging direction of recording paper from the image forming apparatus, and the dominant hand of the user. Since the position of task trigger area and the operation buttons displayed in the area are realized by software, the manner of display may appropriately be changed in accordance with (the dominant hand of) the user who logged-in to the image forming apparatus.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An operation console provided on an apparatus as an object of control operating in one operational mode selected by a user from a plurality of operational modes, comprising:
   a display displaying information corresponding to said selected operational mode to the user;
   a touch panel, arranged on said display, for detecting a request of the user based on a position touched by a finger tip of the user; and
   a display controller comprising a processor which executes a program stored in a memory to divide said display to a plurality of areas and displaying pieces of information while maintaining arrangement of divided areas even when said selected operational mode is changed; wherein
   said display controller displays a plurality of information items allowing the user to input, using said touch panel, a request related to a process executed by said apparatus as the object of control, at the same area of said divided plurality of areas in each operational mode; and
   said plurality of information items include software buttons allowing the user to input at least one of a first request for forming data in a final form, a second request for forming data in an intermediate form and a third request for cancelling setting related to data formation, in said apparatus as the object of control.

2. The operation console according to claim 1, wherein said display controller displays a software button allowing input of said third request close to another software button.

3. The operation console according to claim 1, wherein said display controller displays a software button allowing input of said third request close to all other software buttons.

4. The operation console according to claim 1, wherein said display and said touch panel constitute a touch-panel display.

5. An electronic device provided with the operation console according to claim 1.

6. An image processing apparatus provided with the operation console according to claim 1.

7. The image processing apparatus according to claim 6, wherein
said software button allowing input of said first request is an operation button for inputting an image formation request, or an operation button for inputting an image transmission request;
said software button allowing input of said second request is an operation button for inputting an image capture request; and
said software button allowing input of said third request is an operation button for cancelling contents set for image processing.

8. A method of displaying information in an operation console provided on an apparatus as an object of control operating in one operational mode selected by a user from a plurality of operational modes, comprising:
the display step of displaying information corresponding to said selected operational mode on a display panel;
the detecting step of detecting a user request based on a position touched by a finger tip of the user, on a touch-panel arranged on said display panel; and
the display control step of dividing said display panel to a plurality of areas and displaying pieces of information while maintaining arrangement of divided areas even when said selected operational mode is changed; wherein
said display control step includes the step of displaying a plurality of information items allowing the user to input, through said touch-panel, a request related to a process executed by said apparatus as the object of control, at the same area of said divided plurality of areas in each operational mode; and
said plurality of information items include software buttons allowing the user to input at least one of a first request for forming data in a final form, a second request for forming data in an intermediate form and a third request for cancelling setting related to data formation, in said apparatus as the object of control.

* * * * *